US009859573B2

(12) United States Patent
Morimoto et al.

(10) Patent No.: US 9,859,573 B2
(45) Date of Patent: Jan. 2, 2018

(54) MEMBRANE ELECTRODE ASSEMBLY WITH INTEGRATED FRAME AND FUEL CELL

(75) Inventors: Takashi Morimoto, Osaka (JP); Yoichiro Tsuji, Osaka (JP); Masaki Yamauchi, Osaka (JP); Atushi Murata, Shiga (JP); Mitsuo Yoshimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 866 days.

(21) Appl. No.: 13/519,417

(22) PCT Filed: Mar. 4, 2011

(86) PCT No.: PCT/JP2011/001289
§ 371 (c)(1),
(2), (4) Date: Jun. 27, 2012

(87) PCT Pub. No.: WO2011/118136
PCT Pub. Date: Sep. 29, 2011

(65) Prior Publication Data
US 2012/0288783 A1    Nov. 15, 2012

(30) Foreign Application Priority Data
Mar. 23, 2010    (JP) .................. 2010-066282

(51) Int. Cl.
*H01M 8/10*    (2016.01)
*H01M 8/0271*    (2016.01)
(Continued)

(52) U.S. Cl.
CPC ....... *H01M 8/0271* (2013.01); *H01M 4/8605* (2013.01); *H01M 8/0273* (2013.01);
(Continued)

(58) Field of Classification Search
CPC .................. H01M 8/0271–8/0273; H01M 4/8882–4/8896; H01M 8/1004; H01M 4/8605
(Continued)

(56) References Cited

U.S. PATENT DOCUMENTS

| 2004/0091767 A1 | 5/2004 | Zuber et al. |
| 2004/0209138 A1 | 10/2004 | Ueyama et al. |

(Continued)

FOREIGN PATENT DOCUMENTS

| EP | 2045862 | 4/2009 |
| JP | 5-234606 | 9/1993 |

(Continued)

OTHER PUBLICATIONS

The Extended European Search Report dated Feb. 28, 2013 for the related European Patent Application No. 11758948.1.
(Continued)

*Primary Examiner* — Jonathan G Leong
(74) *Attorney, Agent, or Firm* — Wenderoth, Lind & Ponack, L.L.P.

(57) ABSTRACT

Disclosed is a membrane electrode assembly provided with a polymer electrolyte membrane; a catalyst layer (A) which is laminated onto one surface of the polymer electrolyte membrane; a gas diffusion layer (A) which is laminated onto the catalyst layer (A); a catalyst layer (B); and a gas diffusion layer (B). The outer circumferential section of the catalyst layer (A) is the membrane electrode assembly with an integrated frame which comprises a membrane electrode assembly that protrudes from the gas diffusion layer (A) and a frame adhered to the outer circumferential section of the catalyst layer (A), whereby said frame surrounds the edge of the membrane electrode assembly. The surface that is
(Continued)

adhered to the frame in the outer circumferential section of the catalyst layer (A) comprises a plurality of cracks.

7 Claims, 10 Drawing Sheets

(51) Int. Cl.
*H01M 8/0273* (2016.01)
*H01M 4/86* (2006.01)
*H01M 8/0286* (2016.01)
*H01M 8/1004* (2016.01)
*H01M 4/92* (2006.01)
*H01M 8/1018* (2016.01)

(52) U.S. Cl.
CPC ....... *H01M 8/0286* (2013.01); *H01M 8/1004* (2013.01); *H01M 4/8673* (2013.01); *H01M 4/926* (2013.01); *H01M 2008/1095* (2013.01)

(58) Field of Classification Search
USPC ......................................................... 429/480
See application file for complete search history.

(56) References Cited

U.S. PATENT DOCUMENTS

| | | |
|---|---|---|
| 2009/0087713 A1 | 4/2009 | Yoshida et al. |
| 2009/0136811 A1 | 5/2009 | Kusakabe et al. |
| 2009/0208805 A1 | 8/2009 | Wakabayashi et al. |
| 2010/0248087 A1 | 9/2010 | Tsuji et al. |

FOREIGN PATENT DOCUMENTS

| | | |
|---|---|---|
| JP | 2006-344426 | 12/2006 |
| JP | 2007-103089 | 4/2007 |
| JP | 2009-193860 | 8/2009 |
| JP | 2009-206075 | 9/2009 |
| WO | 2003/077336 | 9/2003 |
| WO | 2006/106908 | 10/2006 |
| WO | 2009/072291 | 6/2009 |

OTHER PUBLICATIONS

International Search Report of PCT Application No. PCT/JP2011/001289 dated Apr. 26, 2011.

MEMBRANE ELECTRODE ASSEMBLY WITH INTEGRATED FRAME AND FUEL CELL

TECHNICAL FIELD

The present invention relates to a frame-integrated membrane electrode assembly and a fuel cell.

BACKGROUND ART

A solid polymer fuel cell is basically composed of a polymer electrolyte membrane which selectively transports hydrogen ion and a pair of catalyst electrodes (fuel electrode and air electrode) which sandwich the polymer electrolyte membrane. The fuel cell which has the above structure can continuously take out electric energy by supplying fuel gas (hydrogen is contained) to the fuel electrode, and supplying oxidizing gas (oxygen is contained) to the air electrode.

The polymer electrolyte membrane is composed of an electrolyte which contains a polymer ion-exchange membrane or the like, such as a sulfonic acid group-containing fluorine resin ion-exchange membrane or hydrocarbon resin ion-exchange membrane. Further, in order for the polymer electrolyte membrane to have an ion transport function, it needs to contain a given quantity of water.

The catalyst electrode is composed of a catalyst layer that is arranged on the polymer electrolyte membrane side and promotes a redox reaction therein and of a gas diffusion layer that is arranged on top of the catalyst layer and has both air permeability and electric conductivity. The catalyst layer is mainly composed of carbon powder carrying a platinum group metal catalyst. A polymer electrolyte membrane integrated with a pair of catalyst electrodes (catalyst layer and gas diffusion layer) is called a membrane electrode assembly (hereinafter also referred to as "MEA").

Further, a technique is known in which the edge of an MEA is surrounded by a frame with high rigidity in order to facilitate easier handling of an MEA with low rigidity (for example, see Patent Literatures 1 and 2). A member composed of an MEA and a frame surrounding the edge of the MEA is called a frame-integrated MEA.

Figure 1A:
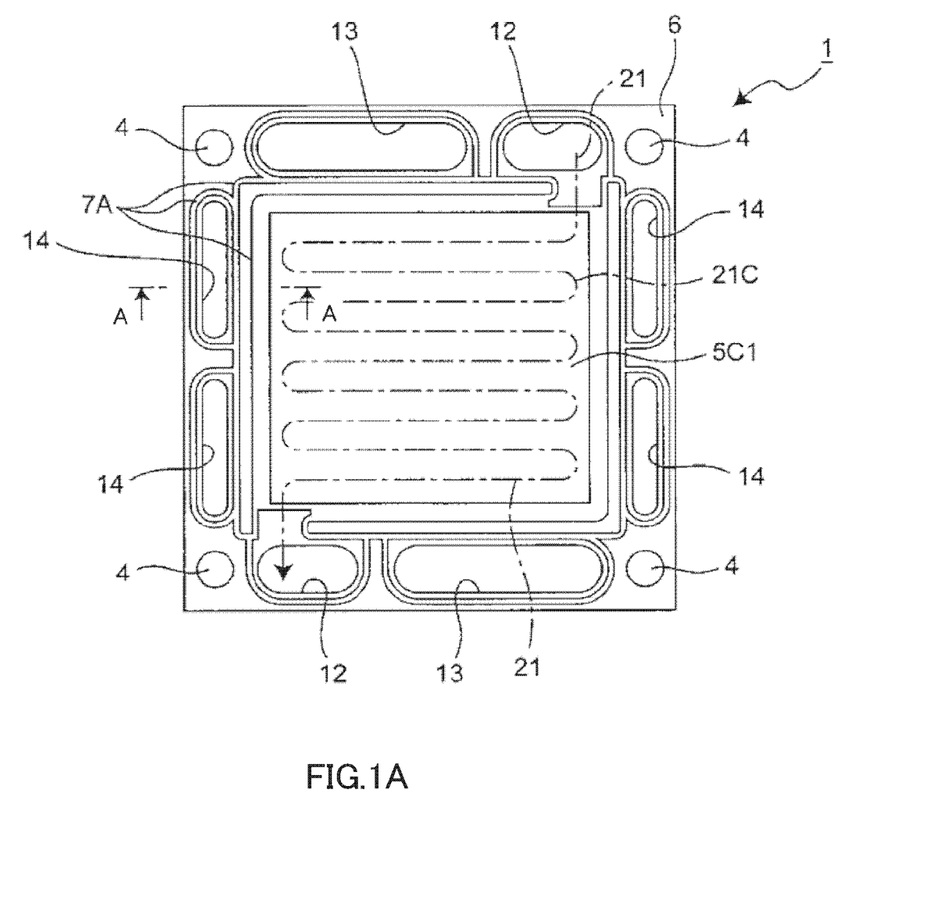
FIGS. 1A and 1B show a conventional frame-integrated MEA.
Figure 1B:
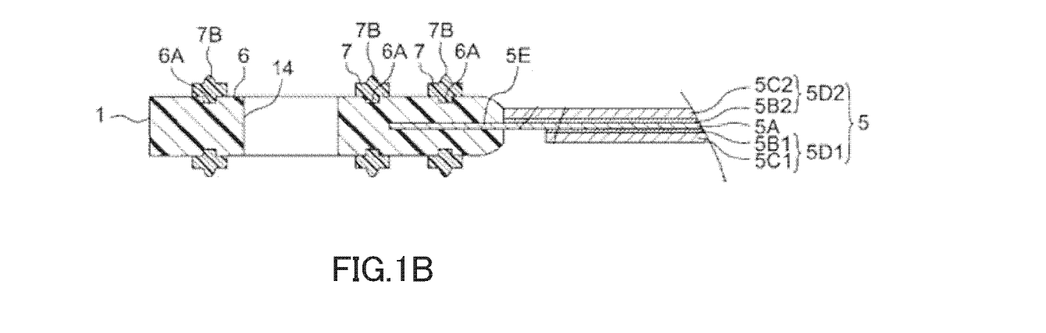

FIG. 1A is a plan view of frame-integrated MEA 1 disclosed in Patent Literature 1. FIG. 1B is a cross-sectional view of frame-integrated MEA 1 of FIG. 1A, taken along line AA.

As shown in FIG. 1A, frame-integrated MEA 1 includes membrane electrode assembly (MEA) 5 and frame 6 surrounding the edge of MEA 5. Further, as shown in FIG. 1B, MEA 5 is composed of polymer electrolyte membrane 5A and a pair of catalyst electrodes 5D (fuel electrode and air electrode) sandwiching polymer electrolyte membrane 5A. Catalyst electrode 5D is composed of catalyst layer 5B disposed on polymer electrolyte membrane 5A and gas diffusion layer 5C disposed on catalyst layer 5B. Frame 6 is adhered to polymer electrolyte membrane 5A.

Further, a technique is known in which the amount of cracks to be formed in a surface of a catalyst layer is adjusted (for example, see Patent Literature 3).

Further, a technique is known in which a reinforcement member is connected to an MEA by hot pressing so as to cover the edge of a catalyst layer in order to facilitate easier handling of the MEA (for example, see Patent Literatures 4 to 6).

CITATION LIST

Patent Literature

PTL 1
WO2009/072291
PTL 2
Japanese Patent Application Laid-Open No. 5-234606
PTL 3
WO2003/077336
PTL 4
Japanese Patent Application Laid-Open No. 2009-193860
PTL 5
U.S. Patent Application Publication No. 2009/0208805
PTL 6
U.S. Patent Application Publication No. 2004/0091767

SUMMARY OF INVENTION

Technical Problem

However, a frame-integrated MEA such as that disclosed in Patent Literature 1 has a problem that adhesion between the MEA and the frame is low. For this reason, with a conventional frame-integrated MEA, there is a likelihood that the MEA is detached from the frame or that gas leaks from a connection between the MEA and the frame.

The present invention has been made in view of the above, and it is therefore an object of the present invention to provide a frame-integrated MEA that achieves high adhesion between the MEA and the frame.

Solution to Problem

The inventors established that adhesion between a frame and an MEA can be improved by providing multiple cracks in a catalyst layer to achieve the anchor effect by a virtue of the cracks. The inventors conducted additional studies and completed the present invention. That is, a first aspect of the present invention relates to a frame-integrated MEA given below.

According to a first aspect, a frame-integrated membrane electrode assembly includes:

- a membrane electrode assembly including a polymer electrolyte membrane, a catalyst layer A disposed on one surface of the polymer electrolyte membrane, a gas diffusion layer A disposed on the catalyst layer A, a catalyst layer B disposed on the other surface of the polymer electrolyte membrane, and a gas diffusion layer B disposed on the catalyst layer B, an outer edge of the catalyst layer A protruding outwardly beyond the gas diffusion layer A; and
- a frame surrounding an edge of the membrane electrode assembly and adhered to the outer edge of the catalyst layer A;
- wherein the catalyst layer A includes multiple cracks in a surface of the outer edge, the surface being adhered to the frame.

According to a second aspect, a frame-integrated membrane electrode assembly according to the first aspect is provided, wherein an area occupied by the multiple cracks in the surface of the outer edge of the catalyst layer A is 10-25%, the surface being adhered to the frame.

According to a third aspect, a frame-integrated membrane electrode assembly according to any one of the first or second aspects is provided, wherein a thickness of the catalyst layer A is 5-20 μm.

According to a fourth aspect, a frame-integrated membrane electrode assembly according to any one of the first to third aspects is provided, wherein:
the catalyst layer A includes carbon powder carrying a metal catalyst, and
a weight ratio of the carbon powder to the metal catalyst is 19:1 to 1:1.

According to a fifth aspect, a frame-integrated membrane electrode assembly according to any one of the first to fourth aspects is provided, wherein:
an outer edge of the catalyst layer B protrudes outwardly beyond the gas diffusion layer B,
the frame is adhered to the outer edge of the catalyst layer B, and
the catalyst layer B includes multiple cracks in a surface of the outer edge, the surface being adhered to the frame.

According to a sixth aspect, a frame-integrated membrane electrode assembly according to any one of the first to fifth aspects is provided, wherein the frame is separated from the gas diffusion layer A and the gas diffusion layer B.

The present invention further relates to a method of manufacturing a frame-integrated MEA given below.

According to a seventh aspect, a method of manufacturing the frame-integrated membrane electrode assembly according to the first aspect is provided, the method including:
providing the polymer electrolyte membrane having the catalyst layer A on one surface and the catalyst layer B on the other surface;
inserting the polymer electrolyte membrane having the catalyst layer A and the catalyst layer B in a mold having a cavity, and exposing in the cavity the outer edge of the catalyst layer A that has the cracks; and
filling the cavity with a resin to form the frame adhered to the outer edge of the catalyst layer A.

According to an eight aspect, a method of manufacturing the frame-integrated membrane electrode assembly according to the seventh aspect is provided, wherein the catalyst layer A is made by a method including:
preparing a paste material containing carbon powder carrying a metal catalyst and a solvent, a weight ratio of the carbon powder to the metal catalyst being 19:1 to 1:1;
applying the paste material; and
drying the applied paste material.

According to a ninth aspect, a method of manufacturing the frame-integrated membrane electrode assembly according to the eighth aspect is provided, wherein a drying rate of the paste material is 2.5 to 20 mg/cm$^2$·min.

According to a tenth aspect, a method of manufacturing the frame-integrated membrane electrode assembly according to any one of the first to eighth or ninth aspects is provided, wherein a drying temperature for the paste material is 40-100° C.

According to an eleventh aspect, a method of manufacturing the frame-integrated membrane electrode according to any one of the eighth to tenth aspects is provided, wherein a drying period for the paste material is 1-5 minutes.

Advantageous Effects of Invention

According to the present invention, adhesion between an MEA and a frame is high, so that there is less likelihood that the MEA is detached from the frame or that gas leaks from a connection between the MEA and the frame. Therefore, according to the present invention, it is possible to provide a frame-integrated MEA with high reliability.

DESCRIPTION OF EMBODIMENTS

1. Frame-Integrated Membrane Electrode Assembly of the Present Invention

The present invention relates to a frame-integrated membrane electrode assembly which constitutes a component of a solid polymer fuel cell. The frame-integrated membrane electrode assembly of the present invention includes (1) a membrane electrode assembly (MEA) and (2) a frame surrounding the edge of the MEA.

(1) Membrane Electrode Assembly

A membrane electrode assembly is composed of a polymer electrolyte membrane and a pair of catalyst electrodes (fuel electrode and air electrode) sandwiching the polymer electrolyte membrane. Each of the catalyst electrodes is composed of a catalyst layer disposed on the polymer electrolyte membrane and a gas diffusion layer disposed on the catalyst layer. Therefore, the membrane electrode assembly includes the catalyst layer disposed on the polymer electrolyte membrane and the gas diffusion layer disposed on the catalyst layer on both surfaces of the polymer electrolyte membrane.

As used herein, the catalyst layer and the gas diffusion layer that are disposed on one surface of the polymer electrolyte membrane are also referred to as catalyst layer A and gas diffusion layer A, respectively. Further, the catalyst layer and the gas diffusion layer that are disposed on the other surface of the polymer electrolyte membrane are also referred to as catalyst layer B and gas diffusion layer B, respectively.

Hereinafter, i) the polymer electrolyte membrane, ii) the catalyst layer, and iii) the gas diffusion layer will be described.

i) Polymer Electrolyte Membrane

The polymer electrolyte membrane is a polymer membrane which selectively transports protons in a humidified state. Materials of the polymer electrolyte membrane are not specifically limited as long as protons can be selectively transported. Examples thereof include fluorine polymer electrolyte membranes and hydrocarbon polymer electrolyte membranes. Specific examples of fluorine polymer electrolyte membranes include Nafion® membranes (DuPont), Flemion® membranes (Asahi Glass Co., Ltd.), Aciplex® membranes (Asahi Kasei Corporation), and GORE-SELECT® membranes (Japan Gore-Tex Inc.).

The outer edge of the polymer electrolyte membrane preferably protrudes outwardly beyond the catalyst layer. By arranging the outer edge of the polymer electrolyte membrane so as to protrude outwardly beyond the catalyst layer, a short circuit is unlikely to occur between the pair of catalyst electrodes.

ii) Catalyst Layer

The catalyst layer contains a catalyst which promotes a redox reaction of hydrogen or oxygen. Normally, the catalyst layer is mainly composed of carbon powder carrying a metal catalyst. Examples of the metal catalyst include platinum group metal catalysts. A feature of the present invention lies in the structure of catalyst layer A. Hereinafter, the structure of catalyst layer A will be described in detail.

The thickness of catalyst layer A is preferably 5-20 μm. Further, the weight ratio of carbon powder to metal catalyst (carbon powder:metal catalyst) in the catalyst layer is preferably 19:1 to 1:1. By adjusting the thickness of the catalyst layer and the weight ratio of carbon powder to metal catalyst in the catalyst layer in this way, desired cracks are likely to be formed in catalyst layer A.

The outer edge of catalyst layer A protrudes outwardly beyond gas diffusion layer A. That is, the size of catalyst layer A is larger than that of gas diffusion layer A. A frame is adhered to the outer edge of catalyst layer A that protrudes outwardly beyond gas diffusion layer A.

Further, catalyst layer A includes multiple cracks in a surface of the outer edge that is adhered to the frame (hereinafter also referred to as "surface that is adhered to a frame"). Here, "crack" means a rift that has reached the surface of the polymer electrolyte membrane among rifts formed in the catalyst layer. Therefore, the polymer electrolyte membrane is exposed at the bottom of a crack. Further, the depth of a crack equals to the thickness of the catalyst layer. The width of a crack is preferably 5-300 μm. When the width of a crack is less than 5 μm, the crack is hard to exhibit the anchor effect (described later). On the other hand, when the width of a crack is greater than 300 μm, the catalyst layer can deteriorate easily.

In the surface of catalyst layer A that is adhered to the frame, the ratio of an area occupied by cracks (hereinafter, also referred to as "area occupied by cracks") is preferably 10-25%. When the ratio of the area occupied by cracks is less than 10%, the anchor effect by a virtue of cracks (described later) will be weakened, and therefore there is a likelihood that sufficient adhesion between the frame and catalyst layer A cannot be ensured. On the other hand, when the ratio of the area occupied by cracks is over 25%, life of the membrane electrode assembly is likely to be short (see Patent Literature 3).

The ratio of the area occupied by cracks can be determined by binarizing a microscopic photograph of the surface of the catalyst layer. Examples of a microscope for obtaining microscopic photographs include electron microscopes, confocal laser scanning microscopes, and optical microscopes. Magnification of a microscopic photograph may be set to 50 to 400-fold and visual field area may be set to $10^4$-$10^6$ μm$^2$. Examples of binary coded processing include fixed threshold processing, variable threshold processing, adaptive binary coded processing, and constant variance enhancement processing. These methods are described in, for example, "Digital gazou shori nyumon (Introduction to Digital Image Processing)," CQ Publishing Co., Ltd., pages 63-67 and "Kagaku keisoku no tameno gazou data shori (Image Data Processing for Scientific Measurement)," CQ Publishing Co., Ltd., pages 111-117.

Figure 7:
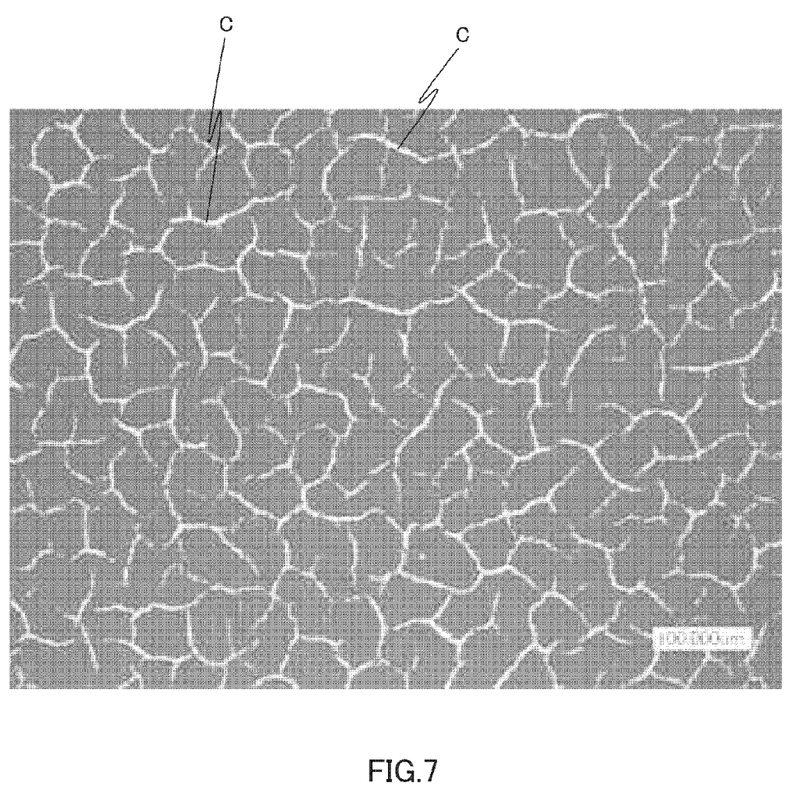
FIG. 7 is an electron microscopic image of a catalyst layer made in Experimental Example.

For example, when performing fixed threshold processing, it is only necessary to convert a microscopic photograph of the surface of the catalyst layer into 256 levels of gray (0-255) to binarize the converted data with a threshold value being set to 120, and to determine the ratio of an area of the microscopic photograph to an area of pixels corresponding to cracks (see FIG. 7).

Catalyst layer A may have cracks in the surface adhered to the frame, but normally has multiple cracks over the entire surface. In order to form such a catalyst layer A having multiple cracks in the surface, it is only necessary to adjust the thickness of catalyst layer A, drying condition of a paste material, a material of catalyst layer A, the weight ratio of carbon powder to metal catalyst in catalyst layer A, and the like. A method for forming catalyst layer A having cracks in the surface will be described later in detail in the section titled "Manufacturing process of frame-integrated membrane electrode assembly."

By providing cracks in the surface of catalyst layer A that is adhered to the frame in this way, cracks exhibit the anchor effect, improving the adhesion between catalyst layer A and the frame. By this means, adhesion between the frame and the membrane electrode assembly is improved, so that it is possible to prevent the membrane electrode assembly from being detached from the frame and to prevent gas from leaking from a connection between the frame and the membrane electrode assembly.

Further, the structure of catalyst layer B is not particularly limited, but, as with catalyst layer A, it is preferable that catalyst layer B protrude outwardly beyond gas diffusion layer B in the direction of the edge of the membrane electrode assembly and that catalyst layer B have multiple cracks in the surface.

iii) Gas Diffusion Layer

The gas diffusion layer is electrically conductive and exhibits permeability of fuel gas or oxidizing gas. The gas diffusion layer may be woven or unwoven fabrics of carbon fibers, or may be a porous sheet made from carbon powder and binder. Further, the gas diffusion layer may be in contact with the frame (described later), but preferably be separated from the frame. Further, as described above, the size of gas diffusion layer A is smaller than that of catalyst layer A.

(2) Frame

Figure 3A:
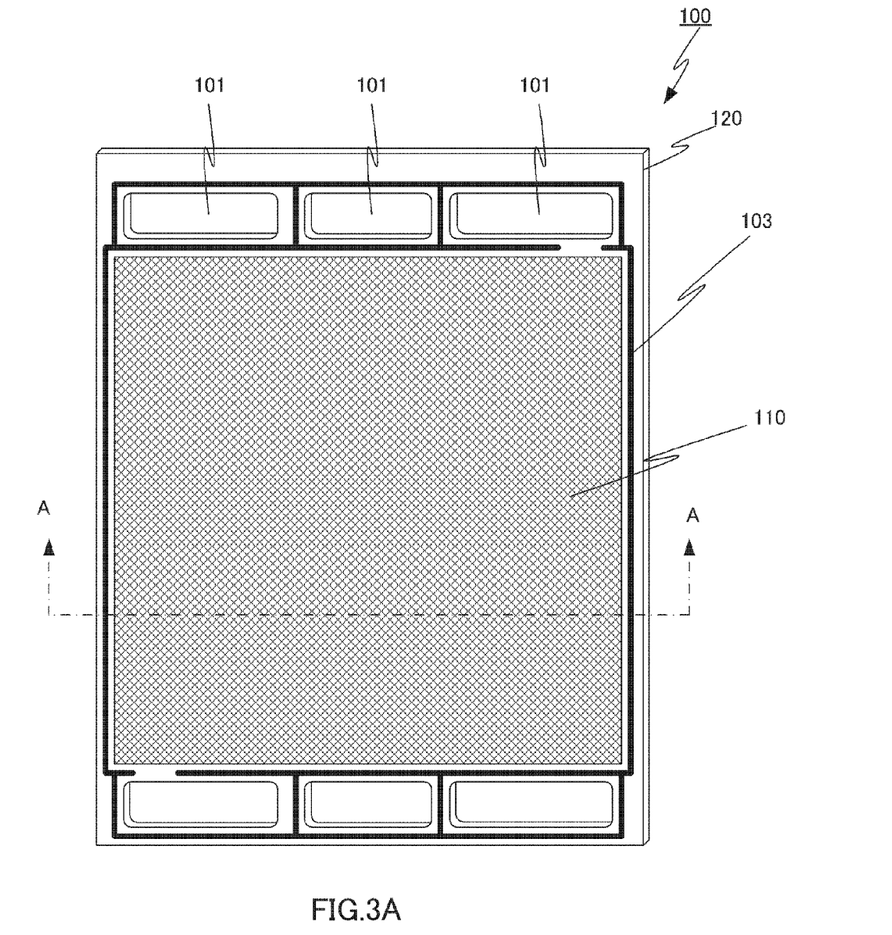
FIGS. 3A and 3B show a frame-integrated membrane electrode assembly according to Embodiment 1.

A frame surrounds the edge of a membrane electrode assembly to support the membrane electrode assembly (see FIG. 3A). By surrounding the edge of the membrane electrode assembly with the frame, it is possible to facilitate easier handling of the membrane electrode assembly and to prevent the membrane electrode assembly from being ruptured.

The frame is preferably made of resin material. Examples of the material of the frame include polyphenylene sulfide (PPS), polypropylene containing glass (PP-G), polystyrene (PS), and silicone (SI). From the viewpoint of heat-resistant property, cost, and durability, PPS and PP-G are preferably used as a material of the frame.

The frame includes a coolant feed manifold for supplying a coolant and a coolant discharge manifold for discharging a coolant. Further, manifolds for intaking and discharging fuel gas and manifolds for intaking and discharging oxidizing gas are formed in the frame. Further, sealing members made of rubber may be formed in the frame for sealing in a coolant, oxidizing gas, or fuel gas.

According to the present invention, the frame is adhered to the outer edge of catalyst layer A. In order to adhere the frame to catalyst layer A, it is only necessary to fill a cavity with a material of the frame, with the outer edge of catalyst layer A being exposed in the cavity, as will be later described. As described above, catalyst layer A has multiple cracks in the surface adhered to the frame. Therefore, the material of the frame intrudes into the cracks. By this means, cracks exhibit the anchor effect, improving adhesion between the frame and catalyst layer A. Accordingly, adhesion between the frame and the membrane electrode assembly is improved, preventing the membrane electrode assembly from being detached from the frame and preventing gases from leaking from a connection between the frame and the membrane electrode assembly.

Further, the frame may be adhered to the outer edge of catalyst layer B (see Embodiment 2).

The frame-integrated membrane electrode assembly of the present invention may be sandwiched by a pair of separators (fuel electrode separator and air electrode separator) to constitute a fuel cell. The separator is a member that is electrically connected to the membrane electrode assembly and prevents mixing of reaction gases.

2. Manufacturing Process of Frame-Integrated Membrane Electrode Assembly

Next, a manufacturing process of the frame-integrated membrane electrode assembly of the present invention will be described with reference to FIGS. 2A to 2G.

Figure 2A:
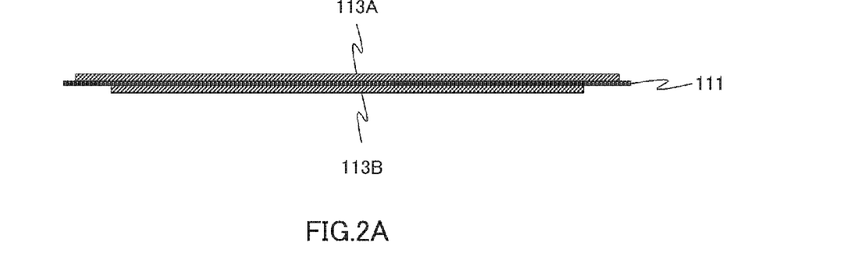
FIGS. 2A to 2C show a flow of a manufacturing process of a frame-integrated membrane electrode assembly according to the present invention.
Figure 2B:
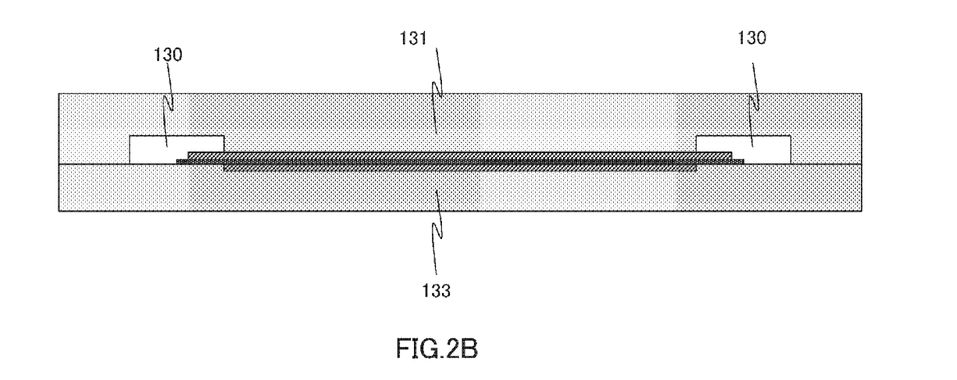
Figure 2C:
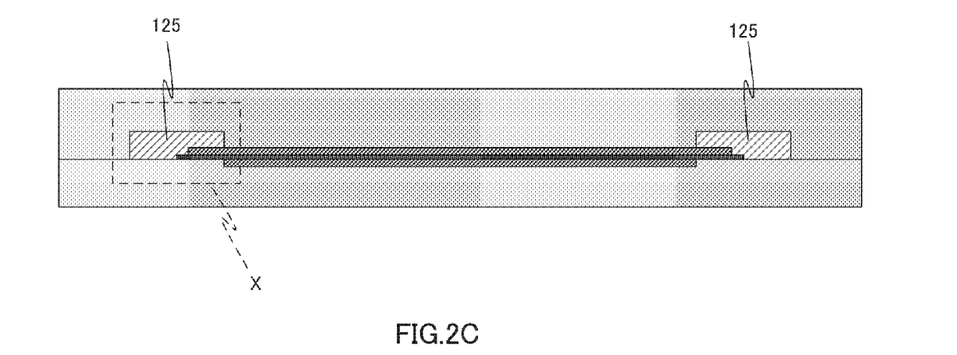
Figure 2D:
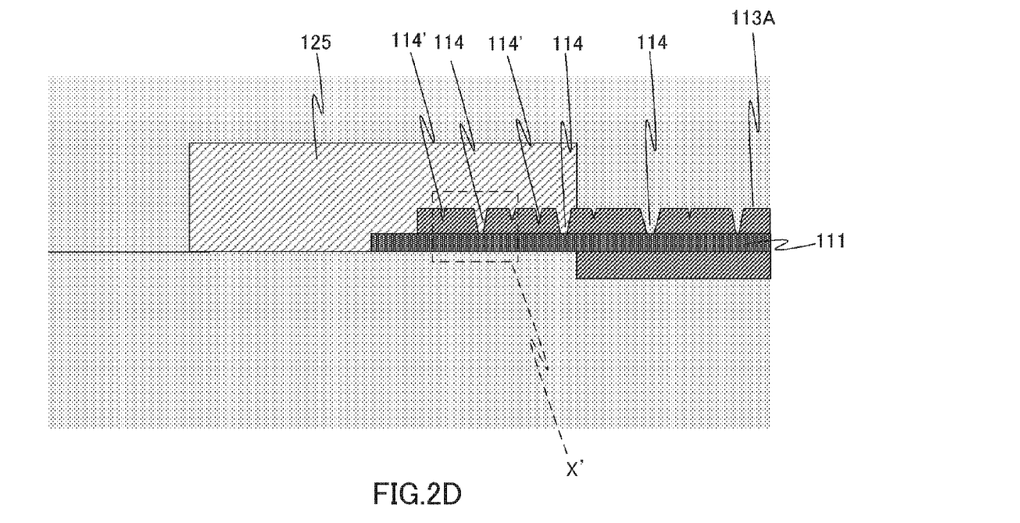
FIGS. 2D and 2E show a flow of a manufacturing process of a frame-integrated membrane electrode assembly according to the present invention.
Figure 2E:
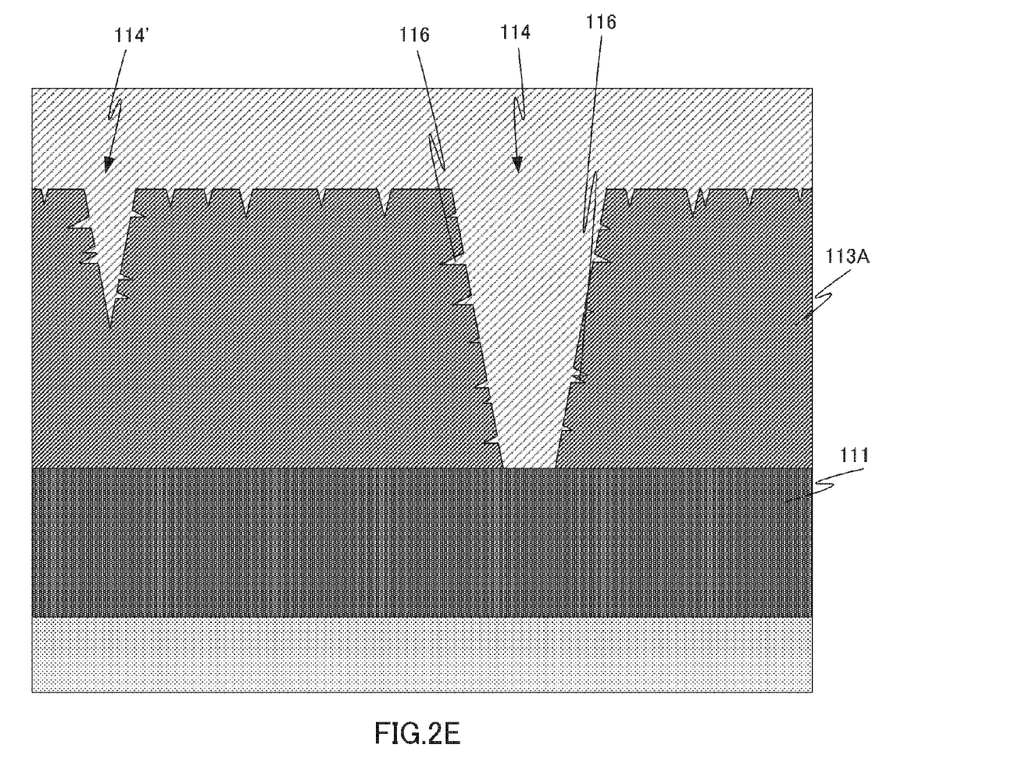
Figure 2F:
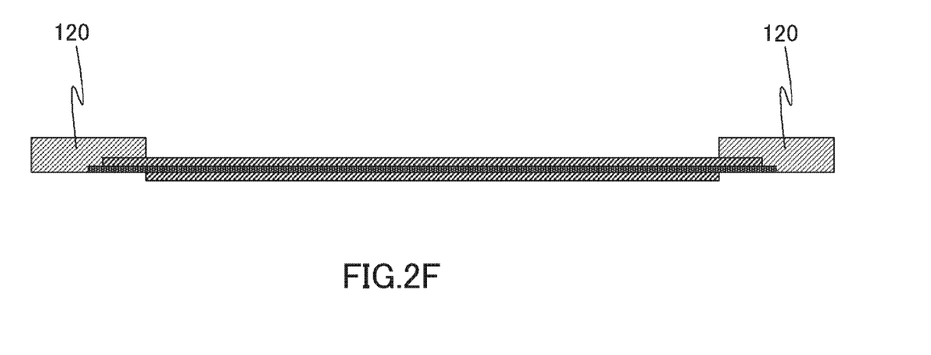
FIGS. 2F and 2G show a flow of a manufacturing process of a frame-integrated membrane electrode assembly according to the present invention.
Figure 2G:
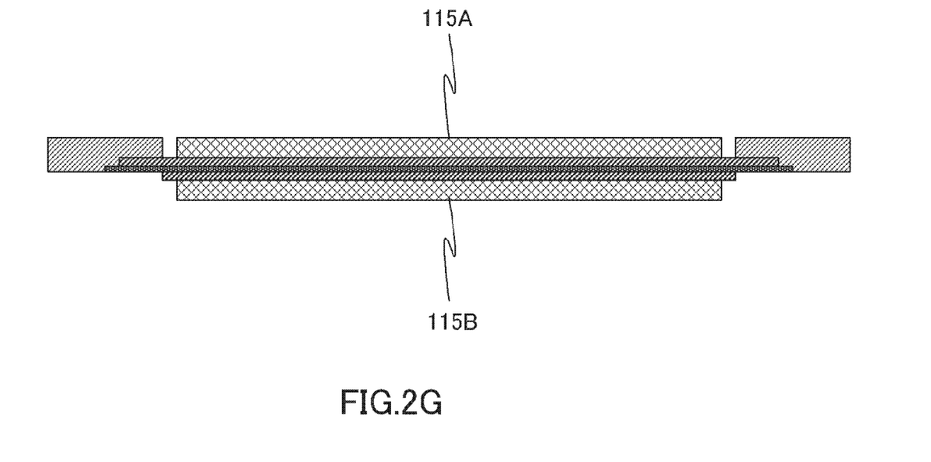

The manufacturing process of the frame-integrated membrane electrode assembly of the present invention includes (1) a first step of providing a polymer electrolyte membrane having catalyst layer A on one surface and catalyst layer B on other surface (FIG. 2A), (2) a second step of inserting the polymer electrolyte membrane having catalyst layer A and catalyst layer B into a mold with a cavity (FIG. 2B), (3) a third step of filling the cavity with a resin to form a frame adhered to the outer edge of catalyst layer A (FIGS. 2C to 2F), and (4) a fourth step of disposing gas diffusion layer A on catalyst layer A and gas diffusion layer B on catalyst layer B (FIG. 2G). Each step will be described in detail below.

(1) FIG. 2A shows the first step.

As shown in FIG. 2A, in the first step, polymer electrolyte membrane 111 having catalyst layer 113A on one surface and catalyst layer 113B on the other surface is provided. In order to provide such a polymer electrolyte membrane 111, it is only necessary to form catalyst layer 113 on polymer electrolyte membrane 111. In order to form catalyst layer 113 on polymer electrolyte membrane 111, a paste material (described later) may be applied on polymer electrolyte membrane 111 and be dried, or catalyst layer 113 made in advance may be disposed on polymer electrolyte membrane 111 by hot pressing or the like.

A feature of the present invention lies in that catalyst layer A has cracks in the surface.

The method of making such a catalyst layer A having cracks includes, for example, A) step A of preparing a paste material of catalyst layer A, B) step B of applying the paste material, and C) step C of drying the applied paste material. The paste material may be applied on a separate substrate or may be directly applied on the polymer electrolyte membrane.

A) In step A, the paste material of catalyst layer A is prepared. The paste material includes a solvent and carbon powder carrying metal catalyst. The paste material may contain a binder. According to the present invention, in order to form desired cracks in catalyst layer A, the weight ratio of carbon powder to metal catalyst in the paste material is adjusted.

Examples of the metal catalyst include platinum group metal catalysts. Examples of the carbon powder include Ketjen Black and acetylene black. The weight ratio of carbon powder to metal catalyst (carbon powder:metal catalyst) is preferably 19:1 to 1:1.

Examples of a solvent contained in the paste include water, ethyl alcohol, methyl alcohol, isopropyl alcohol, ethylene glycol, methylene glycol, propylene glycol, methyl ethyl ketone, acetone, toluene, xylene, n-methyl-2-pyrolidone, and their mixtures.

Examples of the binder include perfluoro sulfonic acid, polytetrafluoroethylene, and polyvinyliden fluoride resin. The weight ratio of carbon powder to binder (carbon powder:binder) is preferably 5:1 to 1:2.

The concentration of solid content (metal catalyst, carbon powder, and binder) in the paste is preferably 15 to 25 wt %.

B) In step B, the paste material is applied.

The paste material may be applied on a separate substrate or may be directly applied on the polymer electrolyte membrane. Examples of means for applying the paste material include a comma coater, a kiss coater, a roll coater, a doctor blade, a spray coater, a die coater, and a gravure coater.

According to the present invention, in order to form desired cracks in catalyst layer A, the amount of the paste material to be applied is adjusted. Specifically, the amount of the paste material to be applied on a separate substrate is adjusted so that the thickness of catalyst layer A to be formed is 5-20 µm. More specifically, the thickness of the paste material immediately after application is preferably 30-200 µm.

C) In step C, the applied paste material is dried. Examples of means for drying the paste material include infrared drying and hot-air drying. With the present invention, in order to form desired cracks in catalyst layer A, drying rate, drying temperature, and drying period are adjusted. Specifically, during drying, the drying rate is adjusted to the range of 2.5 to 20 mg/cm$^2$·min, the drying temperature to the range of 40-100° C., and the drying period to the range of 1-5 minutes. During drying, the drying temperature may be elevated gradually.

By adjusting the weight ratio of carbon powder to metal catalyst in the paste material, the amount of the paste material to be applied, and drying condition in this way, catalyst layer A can be formed to have desired cracks (see FIG. 7). In particular, when the applied paste material is quickly dried, cracks are formed easily in catalyst layer A. That is, desired cracks are easily formed in catalyst layer A when the boiling point of a solvent for the paste material is low, when the drying rate is high, when the drying temperature is high, and when the drying period is short.

A manufacturing method of catalyst layer B is not particularly limited, but catalyst layer B is preferably made using the same method as catalyst layer A.

(2) FIG. 2B shows the second step.

As shown in FIG. 2B, in the second step, polymer electrolyte membrane 111 having catalyst layer 113A and catalyst layer 113B is inserted into the mold having cavity 130, with the outer edge of catalyst layer 113A being exposed in cavity 130. It is preferable that the edge of polymer electrolyte membrane 111 be also exposed in cavity 130.

The mold includes core plate 133 and cavity plate 131 having cavity 130 for frame 120.

(3) FIGS. 2C to 2F show the third step. As shown in FIGS. 2C to 2F, in the third step, cavity 130 is filled with resin 125, which is a material of the frame, with a predetermined injection pressure to mold frame 120 adhered to the outer edge of catalyst layer 113A. The injection pressure applied for filling in resin 125 is preferably 10-200 MPa.

As described above, the outer edge of catalyst layer 113A is exposed in cavity 130. Therefore, frame 120 is adhered to catalyst layer 113A.

FIG. 2D is an enlarged view of square X indicated by dashed lines in FIG. 2C. As shown in FIG. 2D, catalyst layer 113A includes multiple cracks 114 that have reached the surface of polymer electrolyte membrane 111 at their bottom as described above. Further, catalyst layer 113A may include in addition to cracks 114 rifts 114' that do not reach the surface of polymer electrolyte 111 at their bottom. Further, FIG. 2E is an enlarged view of square X' indicated by dashed lines in FIG. 2D. As shown in FIG. 2E, the catalyst layer further includes concaved and convexed features on the surface including wall surfaces of crack 114. For this reason, concaved portions 116 formed on wall surfaces of crack 114 form undercuts.

Resin 125 that has been injected into cavity 130 intrudes into multiple cracks 114 and concaved portions 116 formed in wall surfaces of cracks 114 on catalyst layer 113A. By this means, cracks 114 exhibit the anchor effect, improving adhesion between frame 120 and catalyst layer 113A.

By separating a molded article from the mold after die time has passed, frame 120 adhered to the outer edge of catalyst layer 113A can be obtained (FIG. 2F).

(4) In the fourth step, gas diffusion layer A is disposed on catalyst layer A and gas diffusion layer B is disposed on catalyst layer B (FIG. 2G). As described above, according to the present invention, it is preferable that gas diffusion layer 115 be formed after formation of frame 120. By forming gas diffusion layer 115 after formation of frame 120, gas diffusion layer 115 can be prevented from being deformed by a pressure which is generated when the cavity is filled with a material of the frame. Further, when gas diffusion layer 115 is formed after formation of frame 120, a resin material of the frame will not intrude into gas diffusion layer 115, which is porous. Further, when gas diffusion layer 115 is formed after formation of frame 120, normally, frame 120 will be separated from gas diffusion layer 115.

On the other hand, when gas diffusion layer 115 has sufficient strength, gas diffusion layer 115 may be disposed on catalyst layer 113 before formation of frame 120.

As described above, according to the present invention, adhesion between the frame and catalyst layer A, which is one member of the membrane electrode assembly, is high, so that there is less likelihood that the membrane electrode assembly is detached from the frame or that gas leaks from a connection between the membrane electrode assembly and the frame. For this reason, according to the present invention, it is possible to provide a frame-integrated membrane electrode assembly with high reliability.

Hereinafter, embodiments of the present invention will be described with reference to the accompanying drawings. The present invention is not limited to the embodiments below.

Embodiment 1

Figure 3B:
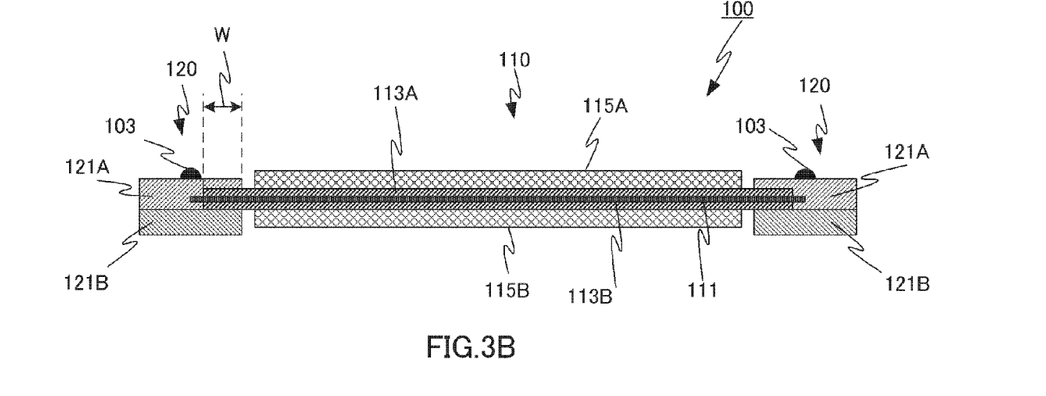

FIG. 3A is a plan view of frame-integrated membrane electrode assembly 100 of Embodiment 1. FIG. 3B is a cross-sectional view of frame-integrated membrane electrode assembly 100 of FIG. 3A, taken along dashed dotted line AA. As shown in FIGS. 3A and 3B, frame-integrated membrane electrode assembly 100 of Embodiment 1 includes membrane electrode assembly 110 and frame 120.

Membrane electrode assembly 110 includes polymer electrolyte membrane 111, catalyst layer 113A disposed on one surface of polymer electrolyte membrane 111, gas diffusion layer 115A disposed on catalyst layer 113A, catalyst layer 113B disposed on the other surface of polymer electrolyte membrane 111, and gas diffusion layer 115B disposed on catalyst layer 113B (see FIG. 3B).

The outer edge of catalyst layer 113A protrudes outwardly beyond gas diffusion layer 115A. Further, the outer edge of catalyst layer 113B protrudes outwardly beyond gas diffusion layer 115B. Frame member 121A (described later) is adhered to the outer edge of catalyst layer 113A. Further, catalyst layer 113A includes multiple cracks in the surface adhered to frame member 121A. Width W of the surface of catalyst layer 113A that is adhered to frame member 121A is preferably 0.5-5.0 mm.

Frame 120 surrounds the edge of membrane electrode assembly 110 and includes multiple manifold holes 101 and sealing members 103. Frame 120 is composed of frame member 121A sandwiching the edge of membrane electrode assembly 110 and of frame member 121B. Materials of frame member 121A and frame member 121B may be different, but preferably are the same. Frame member 121A is adhered to frame member 121B.

As described above, frame member 121A is adhered to catalyst layer 113A. On the other hand, frame member 121B may be in contact with catalyst layer 113B, but is not adhered to catalyst layer 113B.

Next, a manufacturing process of frame-integrated membrane electrode assembly 100 of Embodiment 1 will be described with reference to FIGS. 4A to 4D.

Figure 4A:
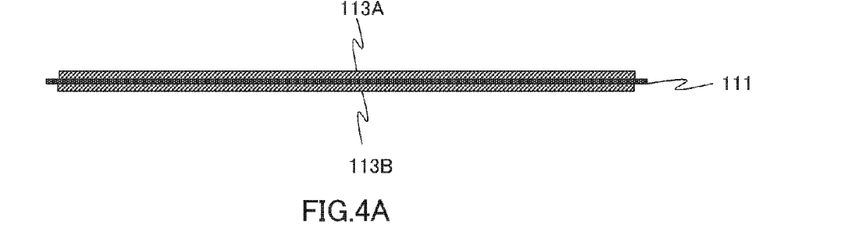
FIGS. 4A to 4E show a flow of a manufacturing process of a frame-integrated membrane electrode assembly according to Embodiment 1.
Figure 4B:
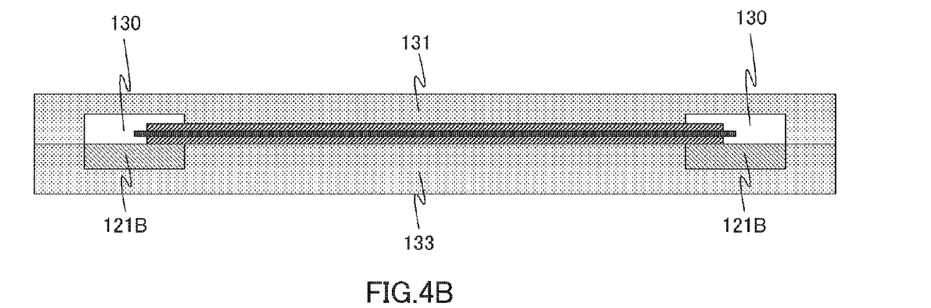
Figure 4C:
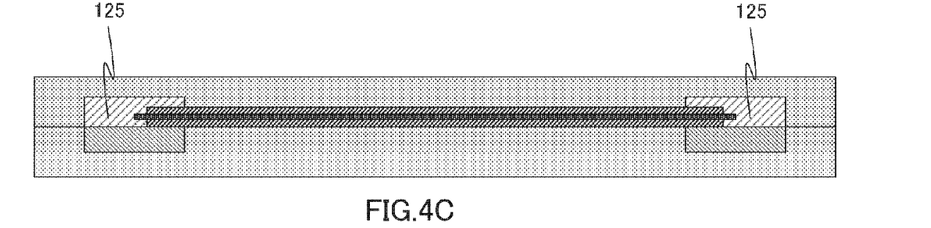
Figure 4D:
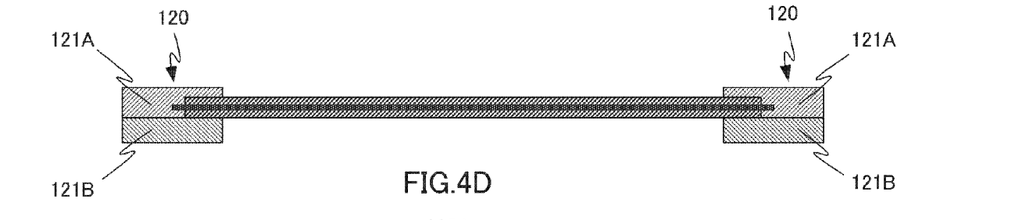
Figure 4E:
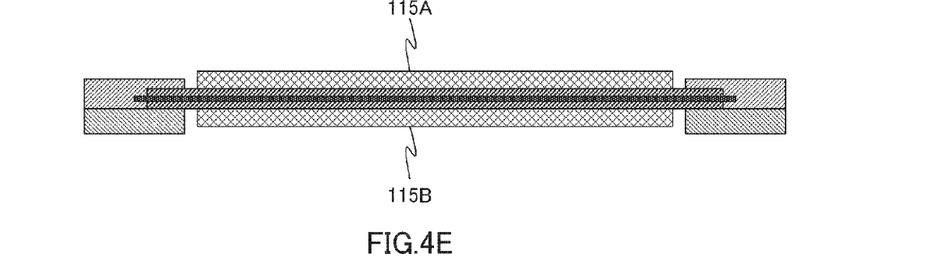

The manufacturing process of frame-integrated membrane electrode assembly 100 of Embodiment 1 includes:

(1) a first step of providing polymer electrolyte membrane 111 having catalyst layer 113A on one surface and catalyst layer 113B on the other surface (FIG. 4);

(2) a second step of sandwiching polymer electrolyte membrane 111 having catalyst layer 113A and catalyst layer 113B by core plate 133 and cavity plate 131 (FIG. 4B);

(3) a third step of filling cavity 130 with material 125 of frame member 121A (FIGS. 4C and 4D); and (4) a fourth step of disposing gas diffusion layer 115A on catalyst layer 113A and disposing gas diffusion layer 115B on catalyst layer 113B (FIG. 4E).

(1) FIG. 4 is a cross-sectional view of polymer electrolyte membrane 111 having catalyst layer 113A and catalyst layer 113B, which has been provided in the first step. Polymer electrolyte membrane 111 having catalyst layer 113A and catalyst layer 113B may be provided by, for example, applying catalyst layers 113A and 113B on polymer electrolyte membrane 111.

(2) FIG. 4B shows the second step.

As shown in FIG. 4B, in the second step, polymer electrolyte membrane 111 having catalyst layer 113A and catalyst layer 113B is sandwiched by core plate 133 on which frame member 121B is arranged in advance and cavity plate 131 having cavity 130 for frame member 121A. At this time, the edge of polymer electrolyte membrane 111, frame member 121B, and the outer edge of catalyst layer 113A are exposed in cavity 130.

Frame member 121B may be injection molded or may be formed by other molding methods. Further, in the second step, the outer edge of polymer electrolyte membrane 111 or the outer edge of catalyst layer 113B is in contact with frame member 121B.

(3) FIG. 4C shows the third step.

As shown in FIG. 4C, in the third step, cavity 130 is filled with material 125 of frame member 121A. As described above, the outer edge of catalyst layer 113A is exposed in cavity 130. Therefore, frame member 121A is adhered to catalyst layer 113A. Further, as described above, catalyst layer 113A has multiple cracks in the outer edge. For this reason, material 125 of frame member 121A also intrudes into cracks in catalyst layer 113A. By this means, adhesion between frame member 121A and catalyst layer 113A will be improved.

Further, as described above, frame member 121B is exposed in cavity 130. Accordingly, frame member 121A is adhered to frame member 121B. It is preferable to use the same material for frame member 121B and frame member 121B as described above, in order to improve adhesion between frame member 121A and frame member 121B.

By separating a molded article from cavity plate 131 and core plate 133 after die time has passed, frame 120 surrounding the edge of polymer electrolyte membrane 111 can be obtained (FIG. 4D).

(4) FIG. 4E shows the fourth step.

As shown in FIG. 4E, in the fourth step, by hot pressing or the like, gas diffusion layer 115A is disposed on catalyst layer 113A and gas diffusion layer 115B is disposed on catalyst layer 113B.

As described above, according to the present embodiment, adhesion between frame member A which is one member of the frame and catalyst layer A which is one member of the membrane electrode assembly, is high, so that there is less likelihood that the membrane electrode assembly is detached from the frame or that gas leaks from a connection between the membrane electrode assembly and the frame.

Embodiment 2

Embodiment 1 has described an embodiment where frame member A is adhered to catalyst layer A, but frame member B is not adhered to catalyst layer B. Embodiment 2 will describe an embodiment where frame member B is also adhered to catalyst layer B.

Figure 5A:
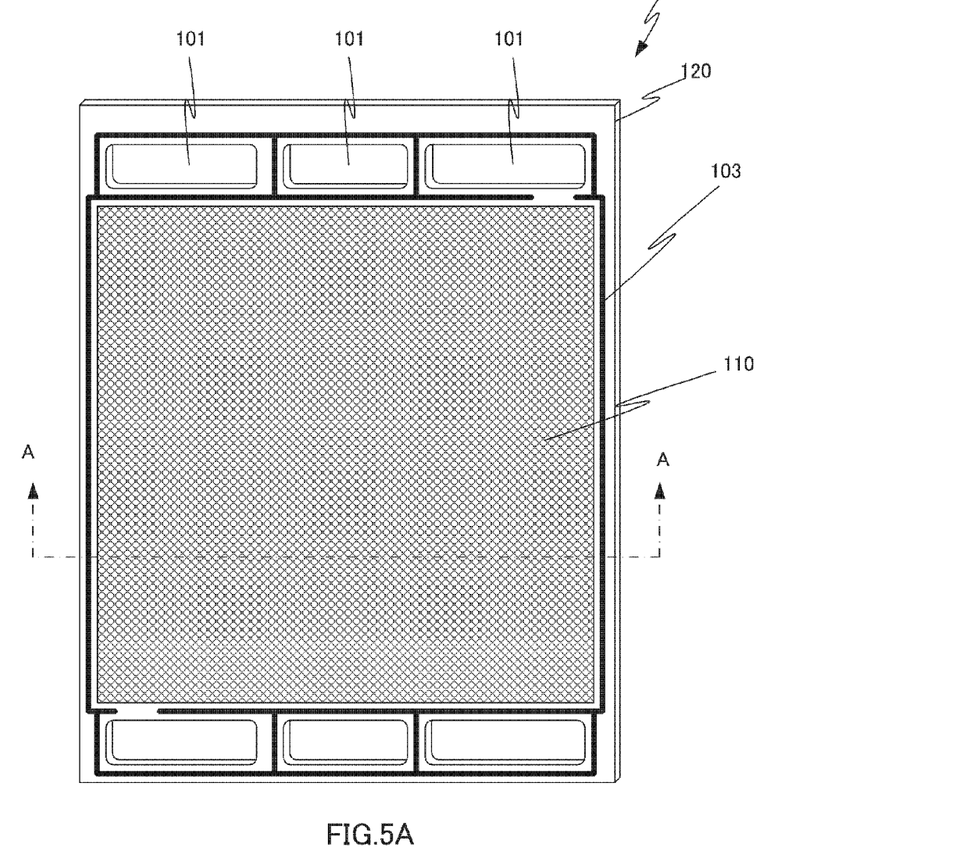
FIGS. 5A and 5B show a frame-integrated membrane electrode assembly according to Embodiment 2.
Figure 5B:
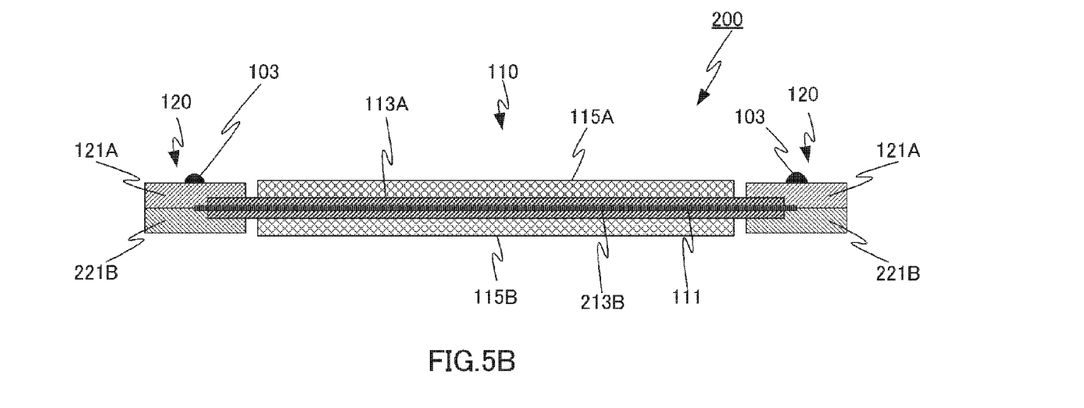

FIG. 5A is a plan view of frame-integrated membrane electrode assembly 200 of Embodiment 2. FIG. 5B is a cross-sectional view of frame-integrated membrane electrode assembly 200 in FIG. 5A, taken along dashed dotted line AA. Frame-integrated membrane electrode assembly 200 shown in FIGS. 5A and 5B is the same as frame-integrated membrane electrode assembly 100 of Embodiment 1 except that frame member 221B is adhered to catalyst layer 213B. Components identical to those of frame-integrated membrane electrode assembly 100 of Embodiment 1 are given the same reference signs and descriptions are not provided.

The outer edge of catalyst layer 213B protrudes outwardly beyond gas diffusion layer 115B. Frame member 221B (described later) is adhered to the outer edge of catalyst layer 213B. Further, catalyst layer 213B has multiple cracks in the surface adhered to frame member 221B.

Next, a manufacturing process of frame-integrated membrane electrode assembly 200 of Embodiment 2 will be described with reference to FIGS. 6A to 6G.

Figure 6A:
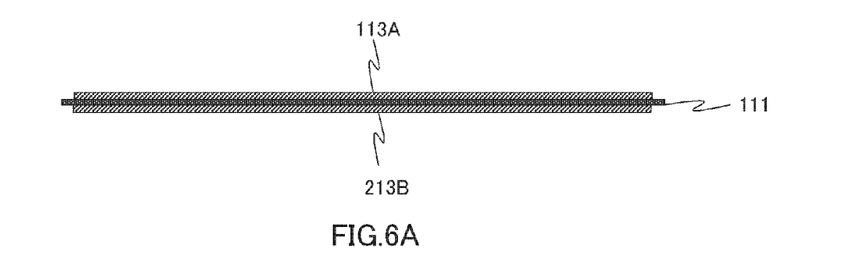
FIGS. 6A to 6D show a flow of a manufacturing process of a frame-integrated membrane electrode assembly according to Embodiment 2.
Figure 6B:
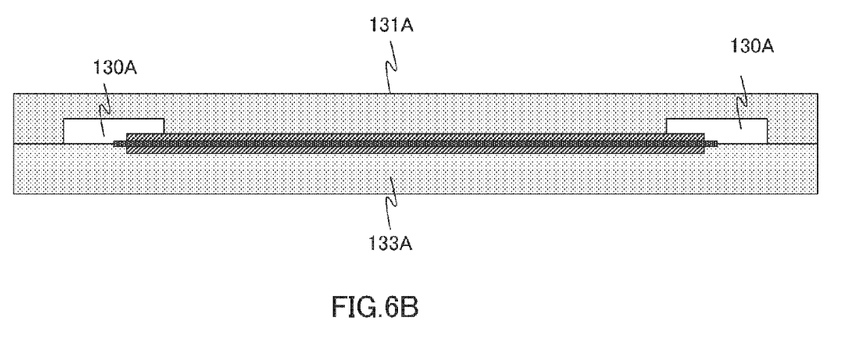
Figure 6C:
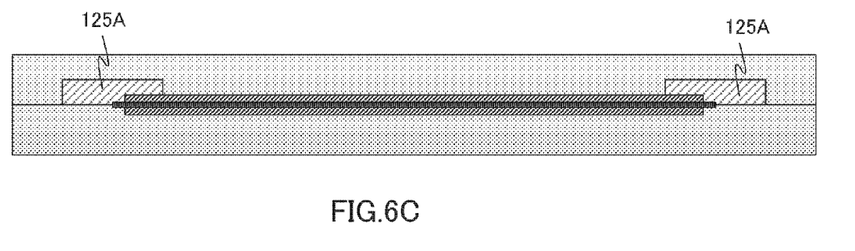
Figure 6D:
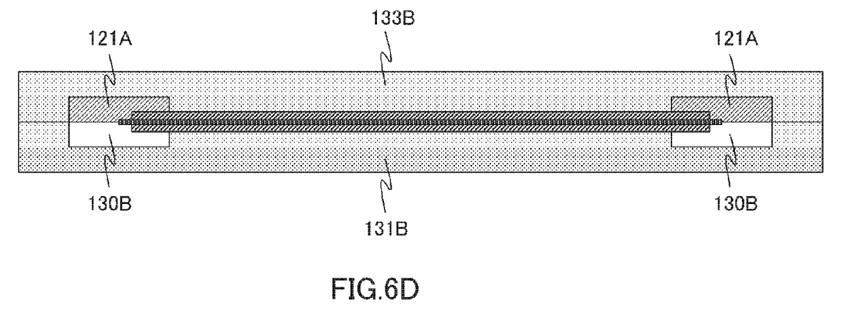
Figure 6E:
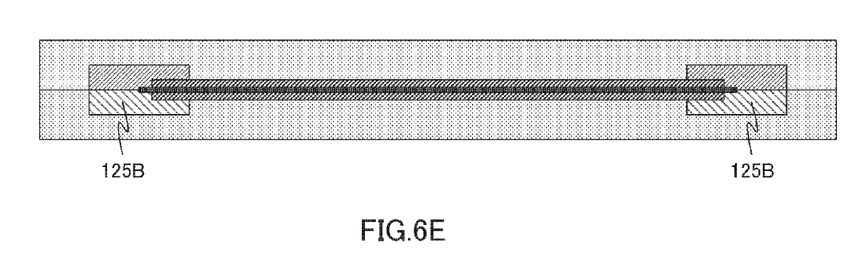
FIGS. 6E to 6G show a flow of a manufacturing process of a frame-integrated membrane electrode assembly according to Embodiment 2.
Figure 6F:
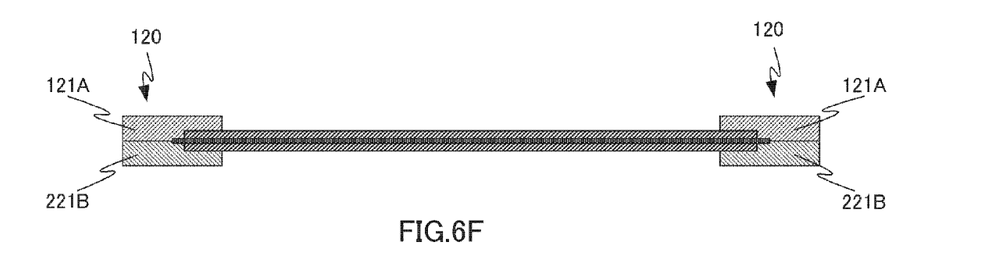
Figure 6G:
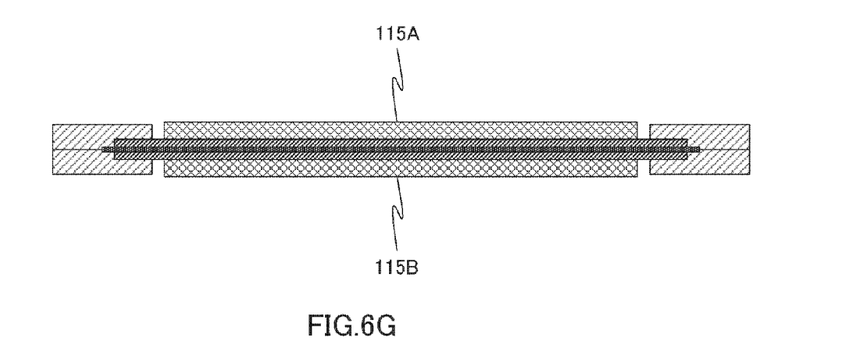

The manufacturing process of frame-integrated membrane electrode assembly 200 of Embodiment 2 includes:

(1) a first step of providing polymer electrolyte membrane 111 having catalyst layer 113A on one surface and catalyst layer 213B on the other surface (FIG. 6A);

(2) a second step of sandwiching polymer electrolyte membrane 111 having catalyst layer 113A and catalyst layer 213B by core plate 133A and cavity plate 131A (FIG. 6B);

(3) a third step of filling cavity 130A with material 125A of frame member 121A (FIG. 6C);

(4) a fourth step of sandwiching polymer electrolyte membrane 111 having catalyst layer 113A and catalyst layer 213B and frame member 121A adhered to the outer edge of catalyst layer 113A by core plate 133B and cavity plate 131B (FIG. 6D);

(5) a fifth step of filling cavity 130B with material 125B of frame member 221B (FIG. 6E); and (6) a sixth step of disposing gas diffusion layer 115A on catalyst layer 113A and gas diffusion layer 115B on catalyst layer 213B (FIG. 6G).

(1) FIG. 6A shows a cross-sectional view of polymer electrolyte membrane 111 having catalyst layer 113A and catalyst layer 113B, which has been provided in the first step.

(2) FIG. 6B shows the second step.

As shown in FIG. 6B, in the second step, polymer electrolyte membrane 111 having catalyst layer 113A and catalyst layer 213B is sandwiched by core plate 133A and cavity plate 131A, with the outer edge of catalyst layer 113A being exposed in cavity 130A. Cavity plate 131A has cavity 130A for frame member 121A.

(3) FIG. 6C shows the third step.

As shown in FIG. 6C, in the third step, cavity 130A is filled with material 125A of frame member 121A to form frame member 121A adhered to the outer edge of catalyst layer 113A. As described above, the outer edge of catalyst layer 113A is exposed in cavity 130A. Accordingly, frame member 121A is adhered to catalyst layer 113A.

Further, as described above, catalyst layer 113A has multiple cracks in the outer edge. For this reason, material 125A of frame member 121A intrudes into cracks in catalyst layer 113A. By this means, adhesion between frame member 121A and catalyst layer 113A will be improved.

By separating a molded article from cavity plate 131A and core plate 133A after die time has passed, frame member 121A adhered to the outer edge of catalyst layer 113A can be obtained.

(4) FIG. 6D shows the fourth step.

As shown in FIG. 6D, in the fourth step, polymer electrolyte membrane 111 having catalyst layer 113A and catalyst layer 213B and frame member 121A adhered to the outer edge of catalyst layer 113A are sandwiched by core plate 133B and cavity plate 131B, with the outer edge of catalyst layer 213B and frame member 121A being exposed in cavity 130B. Cavity plate 131B has cavity 130B for frame member 221B.

(5) FIG. 6E shows the fifth step.

As shown in FIG. 6E, in the fifth step, cavity 130B is filled with frame material 125B of member 221B to form frame member 221B adhered to the outer edge of catalyst layer 213B. As described above, the outer edge of catalyst layer 213B is exposed in cavity 130B. Accordingly, frame member 221B is adhered to catalyst layer 213B.

As described above, catalyst layer 213B has multiple cracks in the outer edge. For this reason, material 125B of frame member 221B intrudes also into cracks in catalyst layer 213B. By this means, adhesion between frame member 221B and catalyst layer 213B will be improved.

Further, as described above, frame member 121A is exposed in cavity 130B. Accordingly, frame member 221B is adhered also to frame member 121A.

By separating a molded article from cavity plate 131B and core plate 133B after die time has passed, frame 120 surrounding the edge of polymer electrolyte membrane 111 having catalyst layer 113A and catalyst layer 213B can be obtained (FIG. 6F).

(6) FIG. 6G shows the sixth step.

As shown in FIG. 6G, in the sixth step, by hot pressing or the like, gas diffusion layer 115A is disposed on catalyst layer 113A and gas diffusion layer 115B is disposed on on catalyst layer 213B.

As described above, according to the present embodiment, not only frame member A but also frame member B is adhered to catalyst layer B. For this reason, adhesion between the frame and the membrane electrode assembly will be improved.

Experimental Example 1

In order to show that catalyst layer A of the present invention has cracks, a catalyst layer is made using the following method and the surface is observed with an electron microscope.

First, a paste material is prepared by mixing Ketjen Black (carbon powder) carrying 40 wt % of platinum as a metal catalyst, perfluorocarbon sulfonic acid (a binder), and a mix solvent of water/isopropyl alcohol/ethylene glycol (1:1:1). The weight ratio among carbon powder, binder, and solvent (carbon powder:binder:solvent) is 1:1:8.

The prepared paste material is applied on a film (release substrate) made of polyethylene terephthalate and is dried to make a catalyst layer. The drying period is set at for 2 minutes, and drying temperature is gradually elevated during the drying process. Specifically, during the drying process, the drying temperatures for the first 30 seconds, the subsequent 60 seconds, and the last 30 seconds are set at 50° C., 80° C., and 100° C., respectively. The average drying rate is 2.5 mg/cm$^2$·min. The surface of the obtained catalyst layer is observed with an optical microscope (QUICK VISION, Mitutoyo Corporation).

FIG. 7 shows a photograph that is obtained by converting the microscopic photograph (100-fold magnification, visual field area: 1.6 mm$^2$) of the surface of the obtained catalyst layer into 256 levels of gray (0-255) and binarizing the converted data by fixed threshold value processing, with a threshold value being set to 120. In FIG. 7, each of white parts C indicates a region in which a crack is formed. The area of white pixels accounts for about 15% of the entire microscopic photograph in FIG. 7.

Experimental Example 2

A catalyst layer is made using the same method as Experimental Example 1 except that the drying condition for a paste material to be applied is changed. Specifically, a catalyst layer is made using the same method as Experimental Example 1 except that, during a drying process, drying temperatures for the first 20 seconds, the subsequent 50 seconds, and the last 50 seconds are set at 60° C., 80° C., and 100° C., respectively. In other words, in Experimental Example 2, the average drying temperature is set higher than that of Experimental Example 1. Therefore, in Experimental Example 2, the drying rate of the paste material is higher than that of Experimental Example 1.

The surface of the obtained catalyst layer is observed with an optical microscope (QUICK VISION, Mitutoyo Corporation). Then, in the same way as Experimental Example 1, the area of white regions indicating cracks is determined by converting a microscopic photograph of the surface of the obtained catalyst layer (100-fold magnification, visual field area: 1.6 mm$^2$) into 256 levels of gray (0-255) and binarizing the converted data using fixed threshold value processing method with a threshold value being set to 120 (not shown). The determined area of cracks is 23%.

The results of Experimental Examples 1 and 2 show that a catalyst layer made by the method of the present invention has cracks that can contribute to the anchor effect. Further, the results of Experimental Examples 1 and 2 suggest that the amount of cracks can be increased by increasing the drying rate of a paste material.

This application is entitled and claims the benefit of Japanese Patent Application No. 2010-066282, filed on Mar. 23, 2010, the disclosure of which including the specification, drawings and abstract is incorporated herein by reference in its entirety.

INDUSTRIAL APPLICABILITY

The frame-integrated membrane electrode assembly of the present invention is suitable for use as a component of polymer electrolyte fuel cells for portable power sources, power sources for electric vehicles, household cogeneration systems and the like.

REFERENCE SIGNS LIST 100, 200 frame-integrated membrane electrode assembly
101 manifold hole
103 sealing member
110 membrane electrode assembly (MEA)
111 polymer electrolyte membrane
113, 213 catalyst layer
114 crack
115 gas diffusion layer
120 frame
121, 221 frame member
125 material of frame
130 cavity
131 cavity plate
133 core plate

The invention claimed is:
1. A frame-integrated membrane electrode assembly comprising:
a membrane electrode assembly including a polymer electrolyte membrane, a catalyst layer A disposed on a first surface of the polymer electrolyte membrane, a gas diffusion layer A disposed on the catalyst layer A, a catalyst layer B disposed on a second surface of the polymer electrolyte membrane, and a gas diffusion layer B disposed on the catalyst layer B, wherein an outer edge of the catalyst layer A protrudes outwardly beyond the gas diffusion layer A; and
a frame surrounding an edge of the membrane electrode assembly and adhered to the outer edge of the catalyst layer A,
wherein the catalyst layer A includes multiple cracks and multiple recesses in a surface of the outer edge of the catalyst layer A, the cracks reaching the first surface of the polymer electrolyte membrane, the recesses not reaching the first surface of the polymer electrolyte membrane, and the cracks being further tapered from the surface of the outer edge of the catalyst layer A toward the polymer electrolyte membrane,
wherein the catalyst layer A further includes multiple concaved portions formed on (i) wall surfaces of the cracks, (ii) wall surfaces of the recesses, and (iii) a remainder of the surface of the outer edge of the catalyst layer A, and wherein an area occupied by the multiple cracks in the surface of the outer edge of the catalyst layer A is 10-25% of the surface of the outer edge of the catalyst layer A, the surface of the outer edge of the catalyst layer A being adhered to the frame.

2. The frame-integrated membrane electrode assembly according to claim 1, wherein a thickness of the catalyst layer A is 5-20 μm.

3. The frame-integrated membrane electrode assembly according to claim 1, wherein:

the catalyst layer A includes a carbon powder carrying a metal catalyst, and a weight ratio of the carbon powder to the metal catalyst is 19:1 to 1:1.

4. The frame-integrated membrane electrode assembly according to claim 1, wherein:

an outer edge of the catalyst layer B protrudes outwardly beyond the gas diffusion layer B, the frame is adhered to the outer edge of the catalyst layer B, and the catalyst layer B includes multiple cracks in a surface of the outer edge, the surface being adhered to the frame.

5. The frame-integrated membrane electrode assembly according to claim 1, wherein the frame is separated from the gas diffusion layer A and the gas diffusion layer B.

6. The frame-integrated membrane electrode assembly according to claim 1, wherein a width of each of the multiple cracks in the surface of the outer edge of the catalyst layer A is 5-300 μm.

7. The frame-integrated membrane electrode assembly according to claim 1, wherein the catalyst layer A is made by a method comprising:

preparing a paste material containing a carbon powder carrying a metal catalyst, a binder, and a solvent, a weight ratio of the carbon powder to the metal catalyst being 19:1 to 1:1, a weight ratio of the carbon powder to the binder being 5:1 to 1:2, a concentration of solid content consisting of the metal catalyst, the carbon powder, and the binder in the paste being 15 to 25 wt %;

applying the paste material; and drying the applied paste material, wherein a drying rate of the paste material is 2.5 to 20 mg/cm$^2$·min, wherein a drying temperature for the paste material is 40-100° C., and wherein a drying period for the paste material is 1-5 minutes.

* * * * *